March 16, 1948.                  C. H. SCOTT ET AL                   2,437,760
                                  RAKING CLASSIFIER
                                 Filed April 14, 1945                3 Sheets-Sheet 2
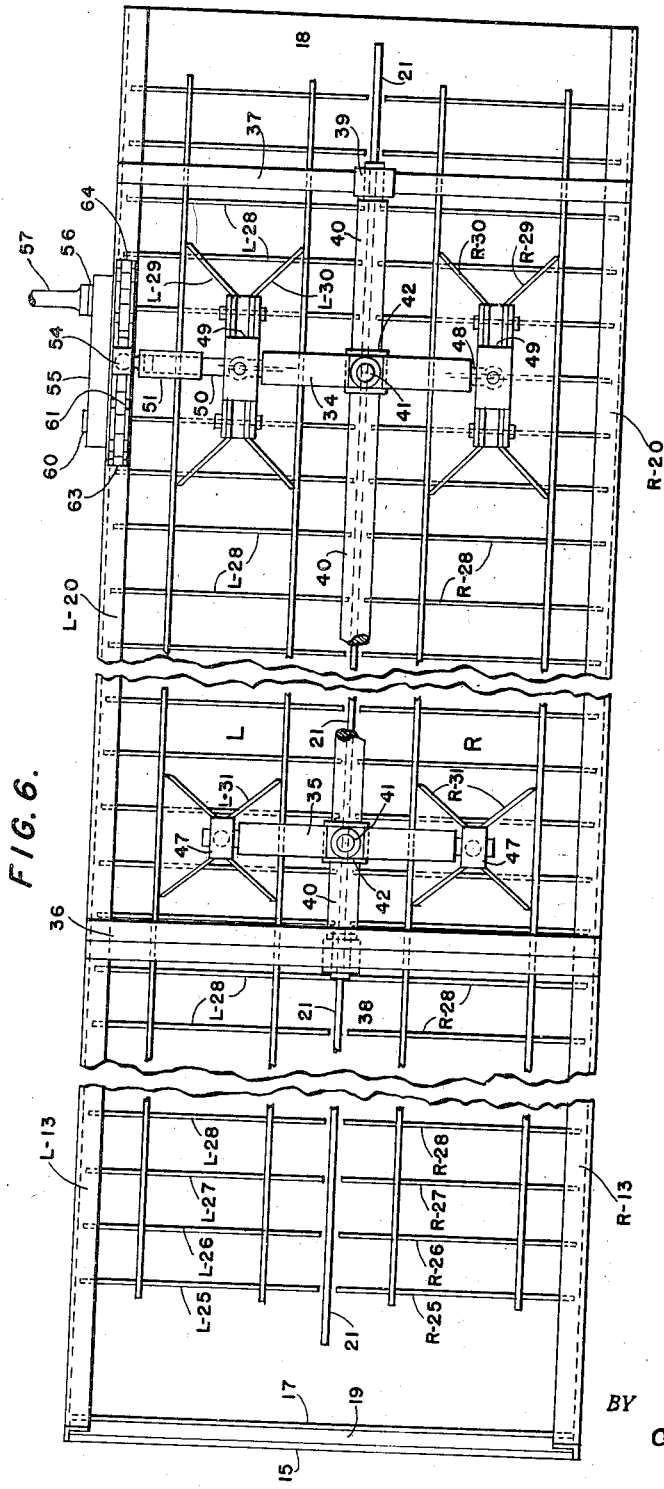
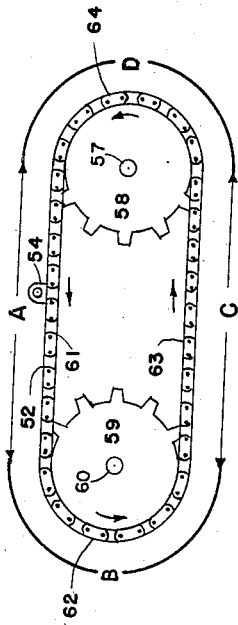
INVENTORS:
CHARLES H. SCOTT &
BY   FRANK L. GRANER,
Arthur Middleton
ATTORNEY March 16, 1948.

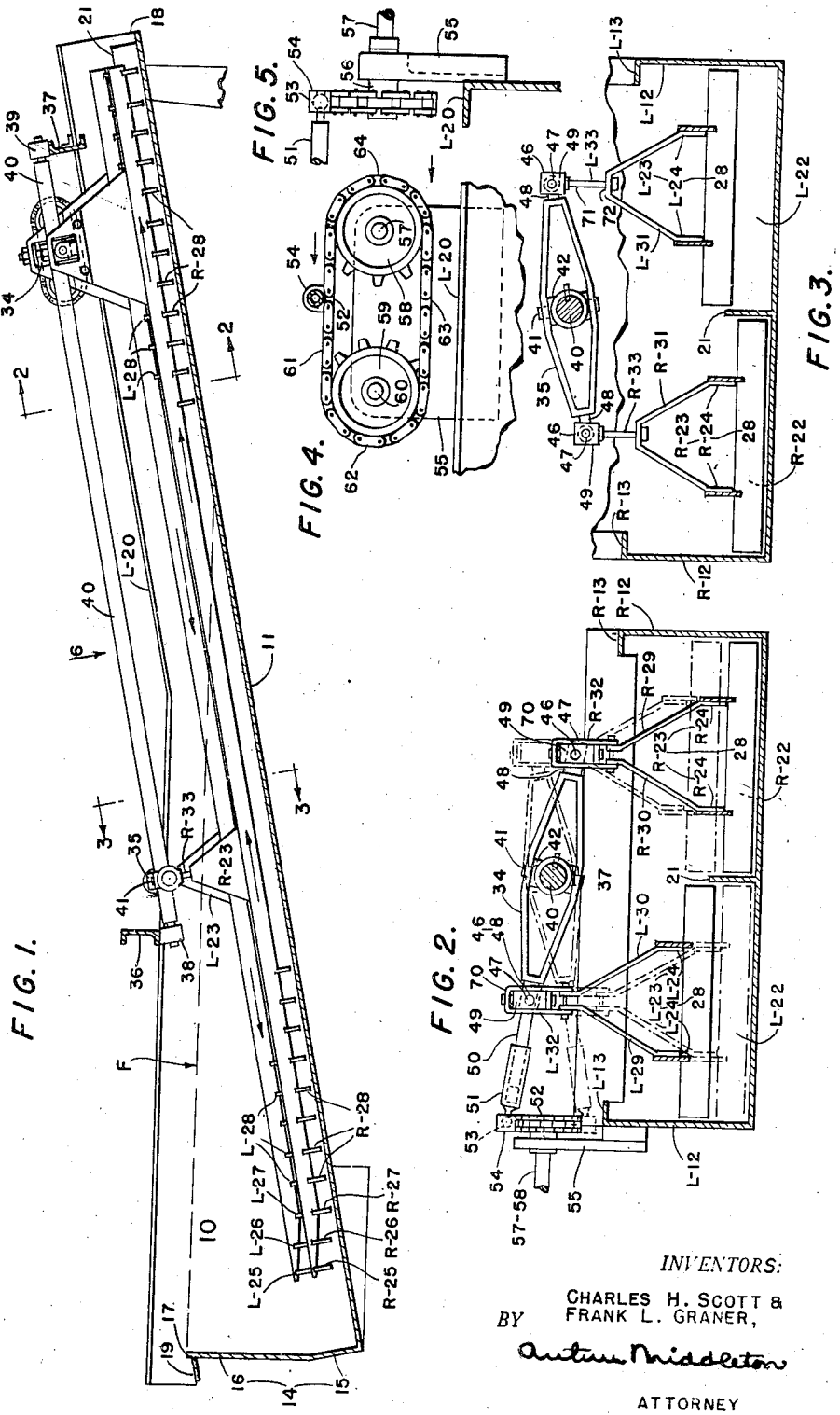

C. H. SCOTT ET AL 2,437,760

RAKING CLASSIFIER

Filed April 14, 1945

INVENTORS:
CHARLES H. SCOTT &
BY FRANK L. GRANER,

Arthur Middleton

ATTORNEY

Patented Mar. 16, 1948

2,437,760

UNITED STATES PATENT OFFICE 2,437,760

RAKING CLASSIFIER

Charles H. Scott, Summit, N. J., and Frank L. Graner, New York, N. Y., assignors to The Dorr Company, New York, N. Y., a corporation of Delaware Application April 14, 1945, Serial No. 588,360

18 Claims. (Cl. 198—224)

This invention relates to classifiers of the reciprocating rake type adapted to treat a bath of suspended solids for the purpose of fractionating the solids according to size so that an overflow contains suspended solids below a certain or predetermined size called fines, while the fraction of larger sized solids are progressively emerged and delivered from the classifier as sands. Such classifiers comprise a tank having an inclined bottom or deck along which longitudinally extending rake structures are adapted to have reciprocating strokes imparted to them. During a stroke up along the inclined deck, settled solids are conveyed by the rakes. To that end the rake structures are lowermost and adjacent the deck during up-deck strokes and are uppermost and away from the deck during down-deck strokes. Thus, the rake structures are adapted to be raised and lowered during the transition between strokes. This invention revolves about (1) means for causing such alternate raising and lowering, and (2) means for causing such reciprocation.

Objects of this invention are to devise such means to be simple, cheap to build, dependable, efficient and yet substantially fool-proof. Other objects will appear as this description proceeds.

The features of advantage of the invention are derived from the use of this invention by embodying it in an arrangement wherein a shaft is longitudinally disposed in the classifier tank from which a balanced pair of rake structures is supported. Means are provided for imparting rocking rotational or oscillating strokes to the shaft under conditions whereby the shaft remains at rest for predetermined periods between strokes. The rake structures derive their support, at least in part, from this shaft so its rocking strokes raise and lower the rake structures alternately toward and away from the inclined decks. The rake structures derive support preferably from one or more cross-arms, cross-bars, or transversely extending arms carried by the rockable shaft so that these arms rock unitarily with the shaft. Thus, the rocking shaft with the arms provide intermittently operating activating means for imparting in alternation, raising and lowering strokes for moving the balanced pair of rake structures toward and away from the inclined deck of the classifier. There is a dwell or rest period between such strokes. Means are also provided for imparting reciprocating strokes to the pair of balanced rake structures in alternation. The means for rocking the arm-bearing shaft and the means for reciprocating the rake structures are so correlated that each rake structure moves up along the inclined deck when in lowered position with respect to its deck, and then down along its inclined deck when it is in raised position with respect to its deck. Between strokes or in the transition period between them, the rake structures are raised or lowered, as the case may be, by means of the intermittent rotational stroke of the shaft. Thus, while the rocking shaft raises and lowers the rake structures, the shaft also carries at least parts of the means for reciprocating the rake structures at times properly correlated with the raising and lowering motions.

The invention hereof may be embodied in various forms and modifications without departing from the spirit and scope thereof as will be manifest from the description which follows:

As illustrative of one specific embodiment of the invention, reference is made to the accompanying drawings constituting a part of this specification and in which:

Fig. 1 is a vertical longitudinal sectional view of a classifier apparatus in which this invention has been embodied wherein the rake structure nearest the observer is in its forward or up-deck raking stroke and moves in the direction indicated by the solid arrows while a rake structure further from the observer is in its non-raking or down-deck stroke and moves in the direction indicated by the broken arrows.

Fig. 2 is a cross-sectional view taken as on the transverse plane indicated by line 2—2 of Fig. 1 looking in the direction of the short arrows, to wit, towards the upper or sands-discharge end of the tank.

Fig. 3 is a cross sectional view taken as on a transverse plane indicated by line 3—3 of Fig. 1 looking in the direction of the arrows, to wit, towards the deep or overflow end of the tank.

Figs. 4 and 5 are respectively a partial elevational view and a partial transverse vertical view showing a detail of rake actuating mechanism applied to a side wall of the classifier tank.

Fig. 6 is a view of the tank and raking mechanism shown in Fig. 1 when an observer looks downwardly in the direction of arrow 6.

Figs. 8 to 11 inclusive are diagrammatic of motions of these elements and rest periods or dwells therebetween. The vertically-extending arcs are indicative of the extent of movements imparted to the rockable shaft and its arms. In the case of the rockable shaft, the curved dotted lines around its axis are indicative of the dwell periods of the shaft between the raking movements, while in the case of the cross-arms carried by the shaft, the heavy straight dotted lines adjacent its free end indicate the reciprocative movement of the cross-arms about their vertical pivot that holds them to the shaft.

Figure 7:
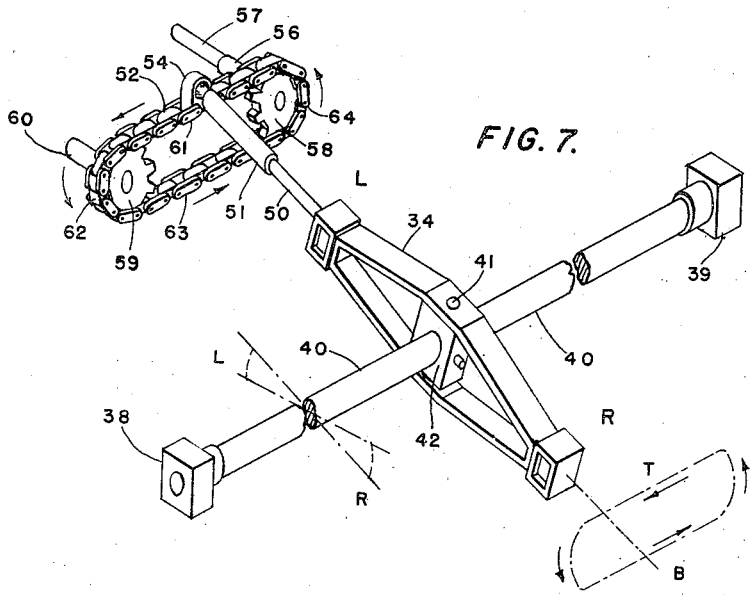
Fig. 7 is a partial perspective view of a form of mechanism for effecting the various strokes for (1) raising and lowering the rakes, and (2) reciprocating the rakes. The view shows a central rockable shaft and a cross-arm carried thereby with means for operating these elements.

Fig. 12 is a further diagrammatic view showing the relationships of strokes and rest periods of the various moving elements of Fig. 7.

In order to facilitate understanding of the invention as to certain terminology employed herein it is here pointed out that (a) the deep or low end of the tank is the rear or liquid overflow end; (b) the upper or high end of the tank is the front or sands-discharge end; (c) the portion of the tank at the right of a vertical plane which includes a centrally located imaginary line extending from the rear of the tank forwardly to the front end thereof is considered herein as the right side portion of the tank. This portion and each of certain other parts or structures at the right side of this plane are identified herein by the letter R when preceding another identifying reference numeral or character; (d) that portion of the tank at the left of said centrally located plane as well as each of certain other parts or structures at the left of said plane are identified herein by the letter L when preceding another identifying numeral or character; (e) movement of a sands-raking structure towards the sands-discharge end of the tank when the rake structure is in the lowered position therefor is known as a forward raking or up-deck stroke; (f) movement of a sand-raking structure in a direction away from the sands-discharge end of the deck when the rake structure is in its uppermost position raised away from the deck is identified as a raised non-raking or down-deck stroke; (g) upward movement of the rake structure from a lower up-deck raking position to its raised non-raking position is identified as a front lifted or front rising stroke; and (h) downward movement of the rake structure from raised non-raking position to lower raking position is identified as a rear lowered or rear lowering stroke.

In the drawings:

The classifier tank is designated as 10. Means for feeding and delivering into the tank a liquid solids suspension or mixture such as metallurgical pulp containing suspended solids to be classified may be provided at a suitable location with respect to the tank. Such location is indicated by the arrow F.

The tank 10 has a sloping bottom or inclined deck 11, from which there rise side walls R12 and L12 and an end wall 14 in the form of a bent plate having a lower section 15 extending at right angles to the inclined deck and a vertically-extending section 16 providing an upper overflow edge 17 at elevation lower than that of the edge or flange portions R13 and L13 of the side walls and lower than that of the forward upper end or edge 18 of the inclined deck 11. The overflow edge 17 of the end wall serves as a weir determining the normal operative overflow elevation for liquid with suspended fine solids therein leaving the tank and thereby determines the normal operative surface level for the liquid within the tank. An overflow receiving launder is provided at 19 from which liquid rid of heavy suspended solids passes from the tank to the place of disposition therefor. Raked or classified larger solids or sands pass as relatively dewatered solids from the forward upper end of the inclined deck. To impart rigidity to the tank there are angle members or edge flanges providing the horizontal portions at R13 and L13 by inclined portions at R20 and L20. In general the tank 10 is made of sheet metal but it will be understood that it can be made of any suitable material depending upon the particular type of employment, the class of material to be treated therein, or the material which is available and suitable for the tank requirements. There extends upwardly from and along the inclined deck a centrally located longitudinally extending partitioning rib 21 whereby there is provided a pair of right and left trough-like rake-receiving sections as R22 and L22 where alternate raking operations are carried out by the respective rake structures R23 and L23. Each rake structure embodies a set of two longitudinals or stringers such as R24 or L24 as the case may be from which there are carried and to which there are fixedly secured longitudinally spaced transverse raking blades such as 25, 26, 27, 28, etc. These blades extend downwardly to regions below the set of longitudinals or stringers by which they are carried.

These rake structures have hangers or spreading supporting connections provided as by carrier plates R29 and R30 or L29 and L30, or straps R31 or L31. The carrier plates for the upper or forward ends of a rake structure are provided as a set comprising plates designated as R29 and R30 for the right rake structure R23 and as L29 and L30 for the left rake structure L23. A spreading supporting strap R31 is provided for the low end of rake structure R23 and a corresponding supporting strap L31 is provided for rake structure L23.

Connection means R32 and L32 are respectively provided between the right and left free end of the forward cross-arm 34 (carried by shaft 40) on the one hand, and the corresponding carrier plates R29 and R30 or L29 and L30 on the other hand. Connecting means R33 and L33 are respectively provided between the right or left free end of rear cross-arm 35 (carried by shaft 40) on the one hand, and the rake supporting strap R31 or L31 on the other hand.

In apparatus of the type to which the present invention is particularly applicable, the arrangement of the rakes is such that when, for example, the rake structure R23 is in the lowered position and is moved forward along the deck, to wit, in the trough or grooved section R22 the other rake structure L23 is in its raised position and is moving in its rearward or non-raking direction above and in substantially vertically spaced relationship in respect to the floor or deck 11.

In Figs. 1, 2 and 6 there are shown carrier members or transverse supporting means forming beams 36 and 37. These transverse beams are mounted upon and are suitably secured to the flange edges of the tank. These beams, respectively carry bearings 38 and 39 which are secured thereto and suitably supported thereupon or therefrom whereby to provide bearing members or carrying elements for the longitudinally extending rockable shaft 40. This shaft is mounted so as to have rockable or tiltable movement with respect to the longitudinal axis of the shaft in the bearings provided therefor. This shaft carries and has extended therefrom transverse fixed members providing the cross-arms or cross-bars 34 and 35. As arranged with respect to the shaft, the structure thus provided has a semblance of a Lorraine cross, but in general the effective length of these cross-arms is the same. In other words, they are of equal length rather than of unequal length as is the case of the true Lorraine cross. In the construction shown, these cross-arms 34 and 35 have vertically extending pivotal mountings provided therefor. The cross-arms are pivotally mounted at 41 on bearings 42 carried by the shaft and they extend to the right and left therefrom. They are capable of having imparted thereto reciprocative movement or strokes about pivot 41 whereby as the result of this pivotal movement, a lowered forward or up-deck raking stroke is imparted to one rake structure, while a return raised down-deck stroke is imparted to the other rake structure.

At an end of each cross-arm 34 or 35, as the case may be, and between it and the carrier plates R29 and R30 or L29 and L30 or spreader supporting straps R31 or L31 corresponding thereto, there is provided a universal connection 46 embodying for example a spherical portion 47 on a rod section 48 extending from the cross-arm, and a socket member 49 carried from the spherical portion or section 47. The socket member 49 at the end of each arm constitutes a part of the connecting element or means extending from the free end of the arm to the corresponding carrier plates or straps. In other words, a socket member 49 constitutes part of each connecting means R32, L32, R33 and L33. The upper cross-arm 34 has an extension section 50 extending upwardly beyond the spherical portion 47 and this section 50 is cooperatively disposed with respect to a surrounding telescoping member 51, the latter having a ball and socket connection with a traveling endless driving chain 52. This ball and socket connection is provided by a spherical knob or end member 53 integral with or connected to the telescopic member 51 and a traveling socket member 54 associated therewith, which socket member 54 is connected to the chain so as to move therewith.

The driving mechanism for the parts just referred to is supported by a fixed carrying bracket 55 secured to the outer portion of a side wall of the tank. This bracket in turn has or carries supporting bearings for the gear shafts hereinafter referred to. There is a supporting bearing 56 for drive shaft 57 which is actuated from any suitable source of power (not shown). The shaft 57 in turn carries and drives a spur gear or sprocket 58 of a set of such gears 58 and 59. The bracket carries a bearing for shaft 60 which serves as a support for the spur gear or sprocket 59. These gears are spaced apart along a line paralleling the sloping bottom of the tank and together provide support for the endless driving chain 52 which is actuated by the turning of the spur gear 58. The endless chain as thus mounted and driven provides upper and lower runs or sections 61 and 63 paralleling the inclined deck of the tank and functioning according to the movement of the particular run to impart the forward or up-deck and the return or down-deck movements to the rake structures, to wit, whereby as one rake structure is moving forwardly in raking position at one period, the other rake structure is returning in its non-raking position. The curved sections 62 and 64 of the chain function during the movement thereof to effect the requisite raising and lowering strokes to the rake structures at the termination of and during the transition between the reciprocative strokes as the apparatus functions.

The mechanism just described functions as follows:

When the traveling socket member 54 is being moved rearwardly along its straight upper path of travel 61, it imparts a forward or up-deck raking stroke to the right rake structure R23 which is lowermost and a reverse or return stroke to the left rake structure L23 which is raised. This is followed by the moving of the traveling socket member 54 downwardly along the rear curve or chain section 62 and this downward movement effects a lifting of the right rake structure R23 and a corresponding lowering of the left rake structure L23; then a continuation of the operation of the driving element effects a movement of the traveling socket member 54 forwardly along and with the lower run 63 of the endless chain thereby imparting a forward or up-deck raking movement for the left rake structure L23 and a corresponding down-deck or return movement of the raised right structure R23. By now, the traveling socket member has reached the end of its straight path of travel and there is imparted thereto, by the forward curved section 64 of the chain as the latter continues to move, that upward movement whereby there is effected a simultaneous lowering of the raised or right rake structure R23 and a simultaneous raising or lifting of the left rake structure L23 which has just performed a raking operation. In this way, continued movement of the chain effects the sought-for reciprocative movements or strokes of rake structures during dwell periods in which there is no raising of the rake structure that is functioning to perform its raking operation.

Respecting the connecting means between the free ends of the cross-arms on the one hand, and the carrier plates or supporting straps of the rake structures on the other hand, suitable sliding connections or lost motion means are provided whereby if an obstruction is encountered as a rake structure is lowered into or towards its raking position, such rake structure is not positively forced downwardly by the arm movement because of the lost motion means or sliding connection provided in and by the connecting means, for example, in the connecting means R32 and L32 the socket member 49 has slidable engagement in a yoke 70 whereby if the rake structure in its downward movement encounters an obstruction, the socket member 49 can continue to move downwardly within and along the yoke 70. Similarly, as to the connecting means R33 and L33 a depending rod portion 71 has sliding engagement with an apertured upper section 72 of the yoke R31 or L31, as the case may be, whereby the rod can continue its downward movement with respect to the yoke if the rake structure which is supported by the particular yoke encounters an underlying obstruction.

There will now be considered diagrammatic study views as presented by Figs. 7 to 11 inclusive. The purpose of these figures is to present in a simple manner fundamental features of an actuating mechanism of general application but useful particularly for imparting particular movement in timed relationship to corresponding balanced sets of structures or members in a serial or sequential manner but in different phase. Such a movement of the corresponding structures involves arrangements by which when one of the structures is raised, the other is lowered, and in which when one of the structures is moved in a forward reciprocative stroke, the other is moved in a backward reciprocative stroke and by which arrangement there is provided (1) a dwell period between the raising and lowering operations, and (2) a dwell between reciprocative strokes of the structures.

While the actuating mechanism of the diagrammatic figures has general application, it has advantageous application, for example, when employed for actuating a set of rake structures disposed in side by side relationship in a classifier having an upwardly inclined deck or floor over and in relation to which said rake structures are operatively disposed.

From these figures, it will be seen that an important aspect of this invention revolves about an operative arrangement of a longitudinally extending member in the form of an oscillatable or rockable shaft carrying one or more transverse or cross-arms mounted to rock unitarily with the shaft to effect from the arms as they rock about the axis of the shaft, a raising of the end of one arm and thereby a portion of a structure supported therefrom, while there is also effected a lowering of the end of the other arm and thereby a portion of the structure supported therefrom.

The apparatus also includes means whereby there is effected a moving of the structure supported from the end of the raised arm in a backward or rearward direction and moving of the structure supported from the end of the other and lowered arm in a forward direction, to wit, during the period of dwell between raising and lowering movements of the ends of the arms because of the rocking of the cross-arms about the axis of the rockable shaft.

In Fig. 7 there is indicated the rockable shaft 40 just referred to. It is mounted in suitable bearing members such as at 38 and 39. A transversely extending pivoted member or cross-arm 34 is mounted on this shaft. The cross-arm 34 is pivotally mounted at 41 on a bearing 42 carried on and by the shaft 40. A cross-arm thus mounted, is capable of having a swinging or pivotal movement imparted thereto relative to the rockable shaft that carries it, to wit, in planes paralleling the longitudinal axis of the shaft. Actuating means for the cross-arm embodies a sprocket and chain mechanism suitably supported in bearings typified by a bearing 56 in which bearing there is turnably mounted a driving shaft 57 at one end of which there is located a spur gear or sprocket 58 secured to the shaft so as to be driven thereby.

In another of similar stationary bearing, there is a shaft 60 carrying a spur gear or sprocket 59. These sprockets are mounted in spaced relationship but so that a line through the axial centers of the sprockets parallels the longitudinal axis of the shaft 40. An endless chain 52 is mounted on and carried by these sprockets and is driven through the medium of a shaft-driven sprocket 58. This chain provides upper and lower straight run sections 61 and 63 and curved end run sections 62 and 64. It moves in the direction indicated by the arrow. On this chain, there is fixedly secured so as to move therewith a traveling socket member 54 for receiving the spherical end 53 of a telescoping member 51. A member extending from the left end of the cross-arm 34 embodies a portion 50 that extends into and has telescoping engagement with the member 51 as a result of which the traveling socket member is moved longitudinally along the straight run sections 61 or 63, as the case may be. There is thus possible what may be viewed as a longitudinal swinging movement of the cross-arm 34 whereby the right and left ends thereof move in a general longitudinal path as indicated by the straight lines T and B of which T indicates the top path of the cross-arm when raised and B indicates the bottom path of the cross-arm when in lowered position, for example, when the traveling socket member 54 is moved by the chain along the upper straight run 61 the R end of the arm is moved forwardly along the lower or bottom longitudinal path B and the left end of the arm is moved backwardly or rearwardly along the upper or top path T.

When the traveling socket 54 is moved by the chains along the curved run 62 the left end of the cross-arm is lowered or moved downwardly as indicated by the arc-shaped heavy curve L and the right end of the arm is raised or moved upwardly along the path as indicated by the arc-shaped heavy curve R.

When the traveling socket member 54 is moved by the chain along the lower straight run 63, the left end of the arm is moved forwardly along the lower or bottom longitudinal path B, while the right end of the arm is moved backward or rearwardly along the upper path T.

When the traveling socket member is moved by the chain upwardly along the curved run 64, the left end of the arm is raised or moved upwardly as indicated by the arc-shaped curve L, while the right end of the arm is being moved downwardly along a path indicated by the arc-shaped curve R.

The four stages or movements referred to are successively illustrated by the respective figures 8, 9, 10 and 11, to wit, as follows: Assuming that the movable socket member 54 is at a starting position 0, namely, at the upper end of the curved run 64 and at the beginning of the upper straight run section 61 and that the corresponding starting point or position for the right and left ends of the cross-arms 34 is indicated by the lower starting position 0 at R and the high starting position 0 at L, in Fig. 8.

For the first stage movement (Fig. 8) the traveling socket member 54 moves forwardly in the direction indicated by the arrow along the upper run 61 with the consequent movement of the left end of the arm 34 from O to I, to wit, along an upper pathway in a backward or rearward direction, while at the same time the lower end of the cross-arm 34 moves in a lower forward direction from O to I. The position of the parts now is shown in Fig. 9.

As to the second stage of movement (Fig. 9) during which the traveling socket member moves downwardly along the curved run 62, there is effected a lowering of the left end of the arm 34 from the point I to the point II and a corresponding raising of the low right end of the arm from the point I to the point II. These movements are along arc-shaped pathways indicated by the broken line. At the end of this second stage the parts now occupy the position shown in Fig. 10.

As to the third stage (Fig. 10) the low left end of the arm is in its rearmost position and the upper right end of the arm is in its foremost or forward position. The movement of the traveling socket member along the straight lower run 62 effects a forward movement of the low left end of the arm 34 from the point II to the point III, to wit, in the forward longitudinal direction, while the right end of the arm moves from the point II of the point III in a longitudinal backward or rearward direction. The parts are now in the position shown in Fig. 11.

Figure 8:
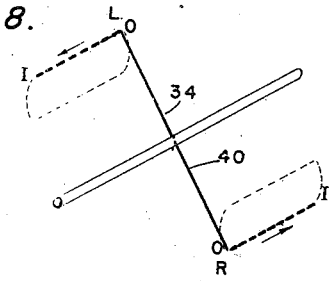
Figure 9:
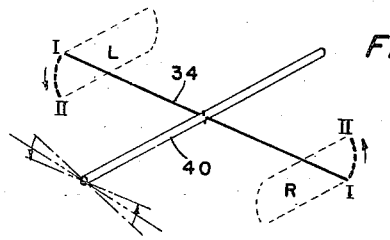
Figure 10:
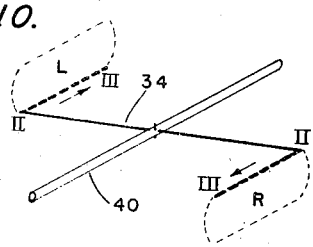

As to the fourth stage (Fig. 11) the traveling socket member 54 in moving upwardly along the curved run 64 to its original starting position O, effects the movement of the left end of the arm from a low forward position, to wit, from III to O and the high right end of the arm moves downwardly from III to O, to wit, along a pathway indicated by the arc-shaped dashes until the parts assume the position shown in Fig. 8, at which time the four stages of operating movement are completed.

Figure 11:
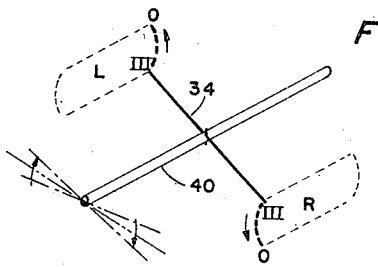

In connection with the foegoing, it will be observed that the up and down movements for the ends of the arm are attained from the interrupted or intermittent rocking of the cross-arm in an arcuate manner to the extent indicated by the angles formed by the cross-lines in the fore part of Figs. 9 and 11, which lines indicate the limits of rocking movement through which the end of the arm is moved from low operative position to high inoperative position for members carried thereby and vice versa.

It will also be clear how the reciprocative movement of the swinging arm 34 in a general longitudinal direction effects the longitudinal movements of the member supported from the arm when moved in a low forward direction and whereby such member is moved in a rearward direction when supported in an uppermost position therefor.

Fig. 12 is a more or less diagrammatic view of the chain and sprockets of Fig. 4, but in this case the path through which the chain moves has been divided into sections numbered A, B, C and D. A and C represent those periods when the rake structures are reciprocating—one raised and moving down-deck, while the other is lowered and moving up-deck, meanwhile the rockable shaft and its cross-arms are at rest or in a period of dwell. B and D represent those periods when the rockable shaft and its cross-arms are rocking, downward during D and upward during B, during which the rake structures are at rest between their reciprocative strokes, or at least are in transition between such strokes.

Thus, the rockable shaft and its cross-arms comprise the activating means for imparting raising and lowering strokes to the rake structures, while the pivotal mounting of the cross-arms on the rockable shaft comprises activating means for imparting reciprocative strokes to the rake structures. It is to be noted that the rockable shaft and its cross-arm is the basic feature on which this invention is built, and also that the rake structures derive at least some of their support from the cross-arm, from which also the rake structures derive their reciprocative strokes. Means are also provided for automatically correlating these operations to be timed in their desired sequence and relationship.

We claim:

1. A classifier having a tank with an inclined bottom, a pair of laterally disposed rake structures having transverse raking blades and longitudinally disposed in the tank, and means for imparting longitudinal reciprocating strokes to the rake structures including a rockable shaft longitudinally disposed with respect to the tank, means for supporting the rake structures from the shaft, and means for interruptedly rocking the shaft for alternately raising and lowering the rake structures during transition from one of their strokes to another.

2. A classifier according to claim 1, wherein the means for supporting the rake structures include cross-bars carried by the shaft and providing right and left arms extending outwardly from the shaft, and means for supporting one rake structure from corresponding arms of the cross-bars and the other rake structure from the other arms of the cross-bars.

3. A classifier according to claim 1, wherein the means for supporting the rake structures includes cross-bars carried by and movably mounted with respect to the rockable shaft, and the means for imparting reciprocating strokes to the rake structures includes members for transmitting such motion thereto to and through the medium of the cross-bars.

4. A classifier according to claim 1, wherein the means for supporting the rake structures includes cross-arms pivotally mounted on the rockable shaft.

5. A classifier according to claim 1, wherein the means for interruptedly rocking the shaft includes means for imparting to the shaft a rotational stroke in one direction and subsequently a rotational stroke in the opposite direction while leaving the shaft at rest between strokes.

6. A classifier according to claim 1, wherein the actuating means for interruptedly rocking the shaft includes sections for imparting to the shaft a rotational stroke in one direction and subsequently a rotational stroke in the opposite direction while leaving the shaft at rest between strokes; and wherein the sections for imparting reciprocating strokes to the rake structures include cross-arms carried by the shaft.

7. A classifier according to claim 1, wherein the means for imparting reciprocating strokes to the rake structures includes reciprocating arms for each rake structure carried by the rockable shaft and extending in opposite directions therefrom.

8. A classifier having a tank with an inclined floor sloping upwardly and forwardly from one end providing a pair of inclined decks, a pair of rake structures cooperatively disposed with a deck underlying each, means for raising and lowering each of said rake structures with respect to its deck, and means for moving each rake structure forwardly adjacent its deck when in lowered position and later for moving each rake structure rearwardly when in raised position; which said means comprise a main shaft extending longitudinally of the tank and overlying the decks, a first cross-bar mounted on the shaft providing arms extending laterally in opposite directions from the shaft, a second cross-bar spaced from the first mounted on the shaft providing arms extending laterally in opposite directions from the shaft, means connecting each arm on one side of the shaft with the same rake structure for supporting the latter, means providing functioning parts for interruptedly imparting limited rotational movement to the shaft and its cross-bars, and also providing operatively associated functioning parts for moving the rake structures reciprocatively.

9. A classifier according to claim 8, in which the means for imparting interruptedly rotational movement to the shaft coacts with at least one of said cross-bars.

10. A classifier according to claim 8, in which each cross-bar is pivotally mounted on the shaft to move about an upwardly extending axis, and means are provided for moving the cross-bars about such axis.

11. A classifier having a tank with an inclined bottom, a pair of right and left rake structures longitudinally disposed in the tank; a rockable shaft longitudinally disposed with respect to the tank; means for supporting said rake structures from the shaft whereby as the shaft is rocked in one direction, it lowers the right rake structure into low position for forward raking movement and raises the left rake structure in high position for rearward non-raking movement and whereby as the shaft is subsequently rocked in the reverse direction there is a lowering of the left rake structure into low position for forward raking movement and a raising of the right rake structure into high position for rearward non-raking movement; an actuating means having spacedly functioning sections for interruptedly imparting to said shaft a rocking movement at one period of time in one direction and a subsequent period of time in an opposite direction and also having spacedly functioning sections for imparting between said rocking periods longitudinal movement to the respective rake structures but in direction reverse to each other, namely, the forward raking movement to whichever rake structure is lowermost and a rearward non-raking movement to whichever rake structure is uppermost.

12. A classifier having a tank with an inclined bottom, a pair of side-by-side rake structures longitudinally-disposed for functioning over the longitudinally-inclined bottom of which one is referred to as the right rake structure while the other is referred to as the left rake structure; bearing means for supporting with respect to the tank a longitudinally extending rockable shaft; a tiltable carrier and positioning mechanism including said shaft; transversely-extending cross-arms connected to and rockable with the shaft providing right and left arm elements extending outwardly in opposite directions from the shaft; and connecting elements between the outer ends of said arm elements and the rake structures corresponding thereto; actuating means having functionally-spaced sections for interruptedly imparting to said shaft a rocking movement at one period of time in a direction for raising the right structure while lowering the left rake structure and at a subsequent period of time in a direction for lowering the left rake structure while raising the right rake structure and also having functionally spaced sections for simultaneously imparting between said rocking periods longitudinal movements to the rake structures in directions reverse to each other, namely, a forward raking movement to whichever rake structure is lowermost and a rearward non-raking movement to the rake structure which is uppermost.

13. A classifier having a tank with an inclined floor sloping upwardly and forwardly from a deep rear end section of the tank to a forward end section while providing a set of right and left section while providing a set of right and left longitudinally-extending inclined decks; longitudinally - extending side-by-side, transversely-spaced rake structures providing a set of right and left rake structures each cooperatively disposed over the inclined deck to which it corresponds; a longitudinally-extending upwardly and forwardly inclined shaft which in plan overlies the space between said rake structures; bearings operatively supported with respect to said tank wherein said shaft is rockably mounted to have tiltable movement about its longitudinal axis; longitudinally - spaced cross-arms constituting walking beams each tiltable with and by said shaft and each providing a set of right and left outwardly-extending arms; means by which the right rake structure is dependingly supported from the outer ends of the right arms; means by which the left rake structure is dependingly supported from the outer ends of the left arms; and actuating means having coordinating sections and parts constructed and arranged for repetitively and in succession carrying out during a first period a tilting movement of the shaft downwardly and to the right for thereby lowering the right rake structure while raising the left rake structure, during a second period longitudinally moving the right rake structure in a forward raking direction while longitudinally moving the left rake structure in a rearward non-raking direction, during a third period tilting the shaft downwardly and to the left for thereby lowering the left rake structure while raising the right rake structure, and during a fourth period longitudinally moving the left rake structure in a forward direction while longitudinally moving the right rake structure in a rearward non-raking direction.

14. A classifier having a tank with an inclined floor sloping upwardly and forwardly from a deep rear end of the tank to a forward end section and providing a pair of longitudinally-extending laterally-disposed inclined deck sections respectively identifiable as an upward and forwardly-extending right deck section and as an upwardly- and forwardly-extending left deck section; longitudinally-extending laterally-disposed transversely-spaced raking structures of which one is a right rake structure and the other a left rake structure each of which is cooperatively disposed over the deck section to which it corresponds; a bearing member which in plan view is located between said rake structures but which in longitudinal vertical view is located at elevation higher than that of corresponding portions of said rake structures when the latter are in the mid-vertical positions; a rockable member mounted on said bearing member so as to be carried by the latter and providing a right arm and a left arm each extending laterally with respect to said bearing member; connecting means between the outer end of the right arm and a portion of the right rake structure for dependingly supporting a portion of the latter from the outer end of said right arm; connecting means between the outer end of the left arm and a portion of the left rake structure for dependingly supporting a portion of the latter from the outer end of said left arm; and actuating means having (1) a section for imparting to said rockable member a turning movement during a first period downwardly and to the right for simultaneously lowering the right rake structure while raising the left rake structure, (2) a section for moving the lowered right rake structure forwardly while moving the raised left rake structure rearwardly, during a second period, (3) a section for imparting to said rockable member a turning movement during a third period downwardly and to the left for simultaneously lowering the left rake structure while raising the right rake structure, and (4) a section for moving the lowered left rake structure in a forward direction while moving the raised right rake structure in a rearward direction during a fourth period; which said actuating means as a whole is constructed and arranged for effecting a repetitive cycle of the specified operative movements for the raking structures.

15. A classifier having a tank with an inclined floor sloping upwardly and forwardly from a deep rear end section of the tank to a forward end section and providing a set of right and left longitudinally-extending inclined decks; longitudinally-extending side-by-side transversely - spaced rake structures providing a set of right and a set of left rake structures each cooperatively disposed over the inclined deck to which it corresponds; a longitudinally-extending upwardly and forwardly inclined shaft which in plan overlies the space between said rake structures; bearings operatively supported with respect to said tank and in which said shaft is rockably mounted to have back-and-forth rotational movement about its longitudinal axis; longitudinally-spaced cross-arms constituting walking beams each tiltable with and by said shaft and each providing a right and a left outwardly-extending arm; means by which each rake structure is dependingly supported from the outer ends of the arms corresponding thereto; means for actuating at one period the shaft for imparting a turning movement thereto downwardly and to the right for thereby lowering the right rake structure while raising the left rake structure; means for longitudinally moving at the next or second period the right rake structure in a forward raking direction while moving the left rake structure in a rearward non-raking direction; means for actuating at the next or third period the shaft for imparting a turning movement thereto downwardly and to the left for thereby lowering the left rake structure while raising the right rake structure; and means for longitudinally moving at the next or fourth period the lower left raking structure in a forward making direction while moving the upper right rake structure in a rearward non-raking direction.

16. A classifier having a tank with a deep rear end and a shallow forward end and an inclined bottom providing upwardly- and forwardly-extending right and left inclined deck portions; a pair of side-by-side but transversely-spaced longitudinally-extending right and longitudinally-extending left rake structures functionable whereby when one rake structure is in a low position for forward raking movement along the inclined deck portion to which it corresponds the other rake structure is in high position for rearward non-raking movement elevated from the inclined deck portion to which it corresponds; and rake-actuating means for imparting forward longitudinal raking movement for whichever rake structure is in low position therefor while imparting rearward longitudinal non-raking movement to that rake structure which is in high position therefor; said classifier being characterized in that it also comprises a rake-carrying and positioning means embodying a longitudinally-extending shaft, longitudinally-spaced bearings supported with respect to the tank and in turn supporting said shaft whereby limited arcuate turning movements in opposite directions can be imparted thereto, longitudinally-spaced cross-arms functioning as transversely-extending walking beams of which each cross-arm is connected to and moves with the shaft and provides a right arm and a left arm extending laterally outwardly from the shaft, connecting means between the outer ends of the right arms and the right rake structure whereby the latter is dependingly supported from the right arms, connecting means between the outer ends of the left arms and the left rake structure whereby the latter is dependingly supported from the left arms, and shaft-actuating means for rocking the shaft and cross-arms for thereby downwardly moving the high rake structure to low raking position when said last-mentioned rake structure has substantially reached the end of its rearward non-raking movement and in a time spaced period thereafter for upwardly moving said last-mentioned rake structure to high position therefor when it has substantially reached the end of its forward raking movement; the parts constituting the rake actuating means and the parts constituting the shaft rotating means being so constructed and arranged that during the normal operations thereof each rake structure has a period in which it is lifted, a period in which it is longitudinally moved rearwardly in non-raking direction, a period in which it is lowered to raking position and a period in which it is longitudinally moved forwardly in low raking position.

17. A classifier having a tank with a deep rear end and a shallow forward end and an inclined bottom providing upwardly- and forwardly-extending right and left inclined deck portions; a pair of side-by-side but transversely-spaced longitudinally-extending right and left rake structures and functionable whereby when one rake structure is in a low position for forward raking movement along the inclined deck portion to which it corresponds the other rake structure is in high position for rearward non-raking movement elevated from and with respect to the inclined deck portion to which it corresponds; said classifier being characterized in that it also comprises a rake-carrying and positioning means embodying a longitudinally-extending shaft, longitudinally-spaced bearings supported with respect to the tank and in turn supporting said shaft whereby limited arcuate turning movements in opposite directions can be imparted thereto; longitudinally-spaced cross-arms of which each is connected to and moves with the shaft and provides a right arm and a left arm extending laterally outwardly from the shaft; connecting means between the outer ends of the right arms and the right rake structure whereby the latter is dependingly supported from the right arms, connecting means between the outer ends of the left arms and the left rake structure whereby the latter is dependingly supported from the left arms; and actuating means for repetitively carrying out the hereinafter specified return steps, said actuating means comprising (1) a rake-actuating section functioning during a first period for imparting forward longitudinal raking movement to whichever rake structure is in low position and for imparting rearward longitudinal non-raking movement for that rake structure which is in high position, (2) a shaft-rocking section functioning during a second period for tilting the shaft in a direction for raising the low rake structure when it has reached the end of its forward raking movement while simultaneously lowering the other rake structure into low raking position therefor, (3) a rake-actuating section functioning during a third period for imparting forward longitudinal raking movement to the last-mentioned rake structure while simultaneously imparting rearward longitudinal non-raking movement to the rake structure which is then in high position, and (4) a shaft-rocking section functioning during a fourth period for rocking the shaft in a direction for raising the low rake structure when it has reached the end of its forward raking movement while simultaneously lowering the other rake structure into low raking position preparatory to a repetition of the operating movements above outlined.

18. A classifier having a tank with an inclined bottom, a pair of laterally adjacent rake structures extending longitudinally in the tank and having spaced transverse conveying blades carried thereby, means for supporting and imparting cyclic movement to the rake structures including a rockable shaft longitudinally-disposed with respect to the tank and overlying the space between said adjacent rake structures, members extending laterally on both sides of the shaft having their respective outer ends each connected to corresponding longitudinally reciprocable rake structures and whereby the rake structures effectively counter-balance each other, means for continually rocking the shaft for alternatively raising and lowering each rake structure during transition from one of its longitudinal strokes to the other, and operating means alternately functionable for imparting forward longitudinal movement for that rake structure last lowered from non-raking position into low raking position and for imparting rearward longitudinal movement for that rake structure last raised from low raking position.

CHARLES H. SCOTT.
FRANK L. GRANER.